(12) United States Patent
Kikuchi et al.

(10) Patent No.: US 10,375,294 B2
(45) Date of Patent: Aug. 6, 2019

(54) FOCUS DETECTION APPARATUS AND FOCUS DETECTION METHOD

(71) Applicant: Olympus Corporation, Hachioji-shi, Tokyo (JP)

(72) Inventors: Tetsuo Kikuchi, Hachioji (JP); Koichi Shintani, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/847,792

(22) Filed: Dec. 19, 2017

(65) Prior Publication Data

US 2018/0176455 A1 Jun. 21, 2018

(30) Foreign Application Priority Data

Dec. 21, 2016 (JP) ................................. 2016-248389

(51) Int. Cl.
*H04N 5/232* (2006.01)
*H04N 5/369* (2011.01)
*H04N 5/235* (2006.01)
*H04N 5/378* (2011.01)

(52) U.S. Cl.
CPC ....... *H04N 5/23212* (2013.01); *H04N 5/2351* (2013.01); *H04N 5/2352* (2013.01); *H04N 5/2353* (2013.01); *H04N 5/23287* (2013.01); *H04N 5/23293* (2013.01); *H04N 5/232122* (2018.08); *H04N 5/232127* (2018.08); *H04N 5/3696* (2013.01); *H04N 5/378* (2013.01); *H04N 5/23209* (2013.01)

(58) Field of Classification Search
None
See application file for complete search history.

(56) References Cited

U.S. PATENT DOCUMENTS

2003/0227607 A1* 12/2003 Kato .................... G03F 7/70058
355/53
2009/0135273 A1* 5/2009 Kusaka .............. H04N 5/23212
348/222.1

(Continued)

FOREIGN PATENT DOCUMENTS

JP 2015-072357 4/2015
JP 2016138999 A * 8/2016 ............... G02B 7/28

OTHER PUBLICATIONS

JP 2016-138999; Focus Adjustment Device and Imaging Device Using the Same and Focus Adjustment Method; JPlatPat, Aug. 4, 2016; Canon Inc; English Translation; pp. 1-10 (Year: 2016).*

*Primary Examiner* — Cynthia Segura
(74) *Attorney, Agent, or Firm* — John C. Pokotylo; Pokotylo Patent Services

(57) ABSTRACT

A focus detection apparatus includes an imaging element includes that a plurality of focus detection pixels, a correction value calculation unit that calculates a correction value used to correct pixel signals based on an optical state before the imaging element performs imaging for still image capturing or imaging for focus detection, a correction unit that performs correction using the correction value simultaneously with reading the pixel signals from the focus detection pixels subsequent to the imaging for the still image capturing or the imaging for the focus detection by the imaging element, and a focus detection unit that performs focus detection based on the corrected pixel signals.

10 Claims, 11 Drawing Sheets

(56) References Cited

U.S. PATENT DOCUMENTS

| | | | | |
|---|---|---|---|---|
| 2010/0110272 A1* | 5/2010 | Sugawara | .......... | H04N 5/23212 348/341 |
| 2011/0085785 A1* | 4/2011 | Ishii | .............. | G03B 13/00 396/104 |
| 2014/0071303 A1* | 3/2014 | Hasegawa | .......... | H04N 5/23212 348/208.11 |
| 2016/0205312 A1* | 7/2016 | Ito | .............. | G03B 13/36 348/345 |
| 2018/0063413 A1* | 3/2018 | Yoshino | ............ | G03B 7/006 |

* cited by examiner

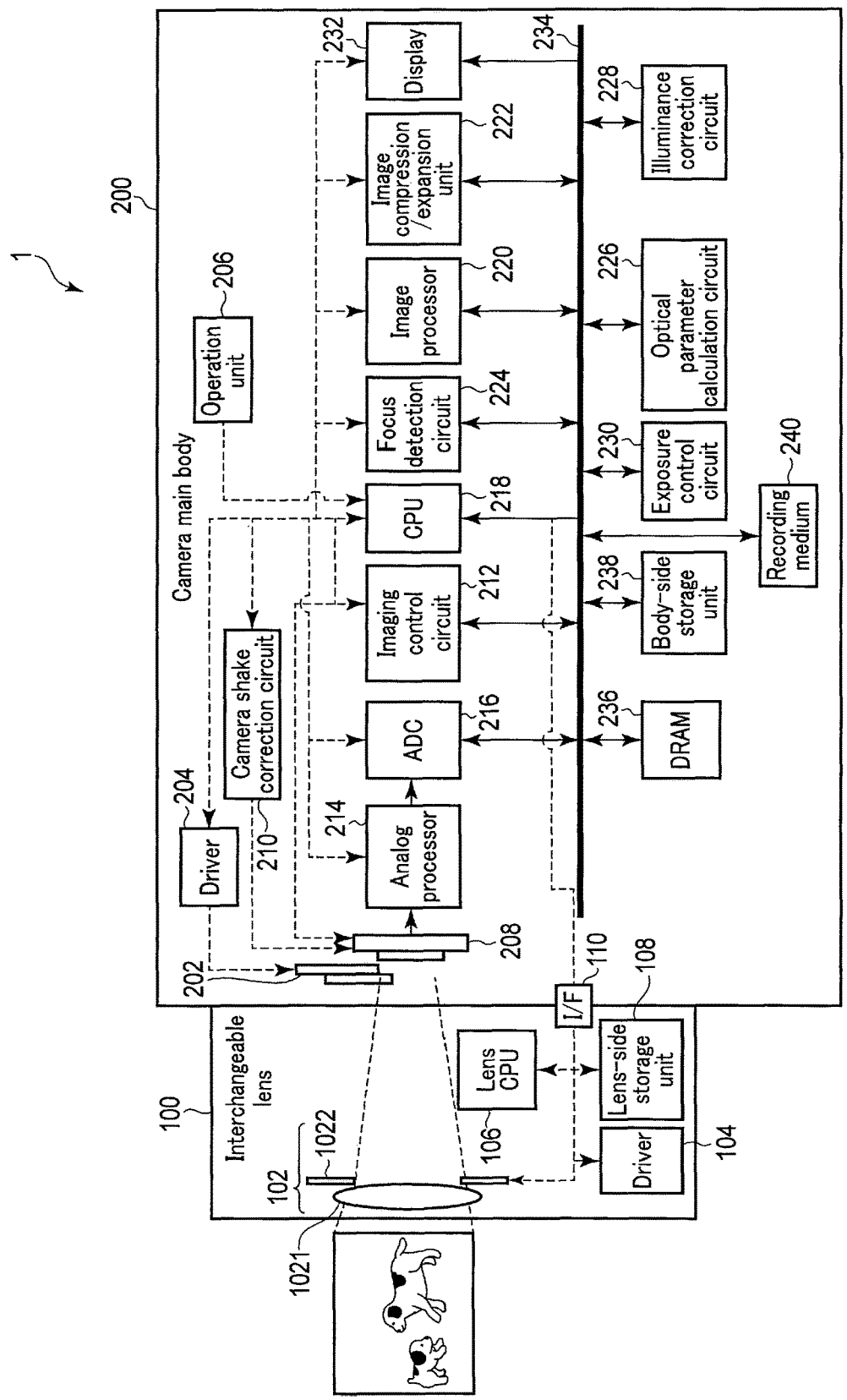
F I G. 1

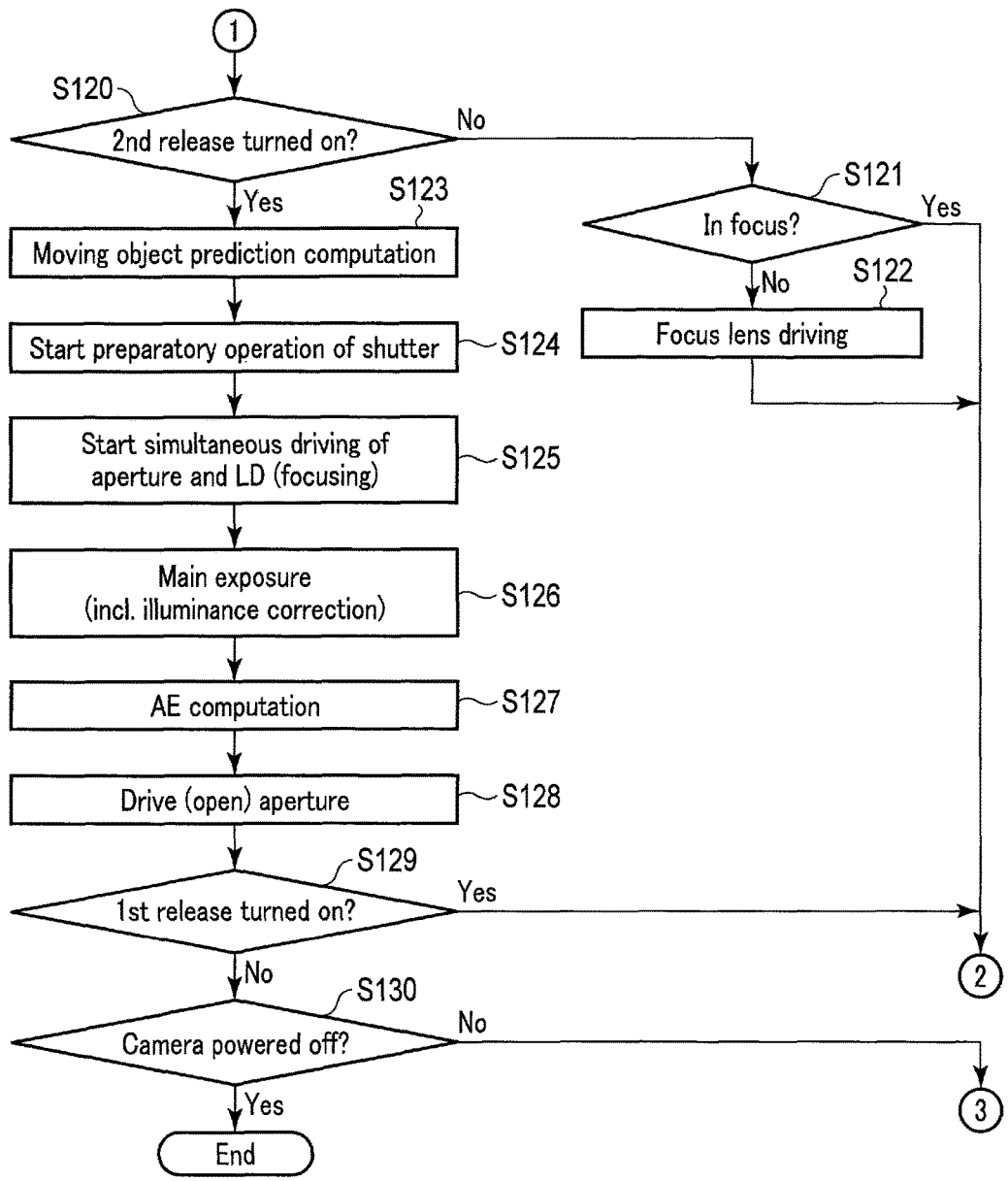
F I G. 2B

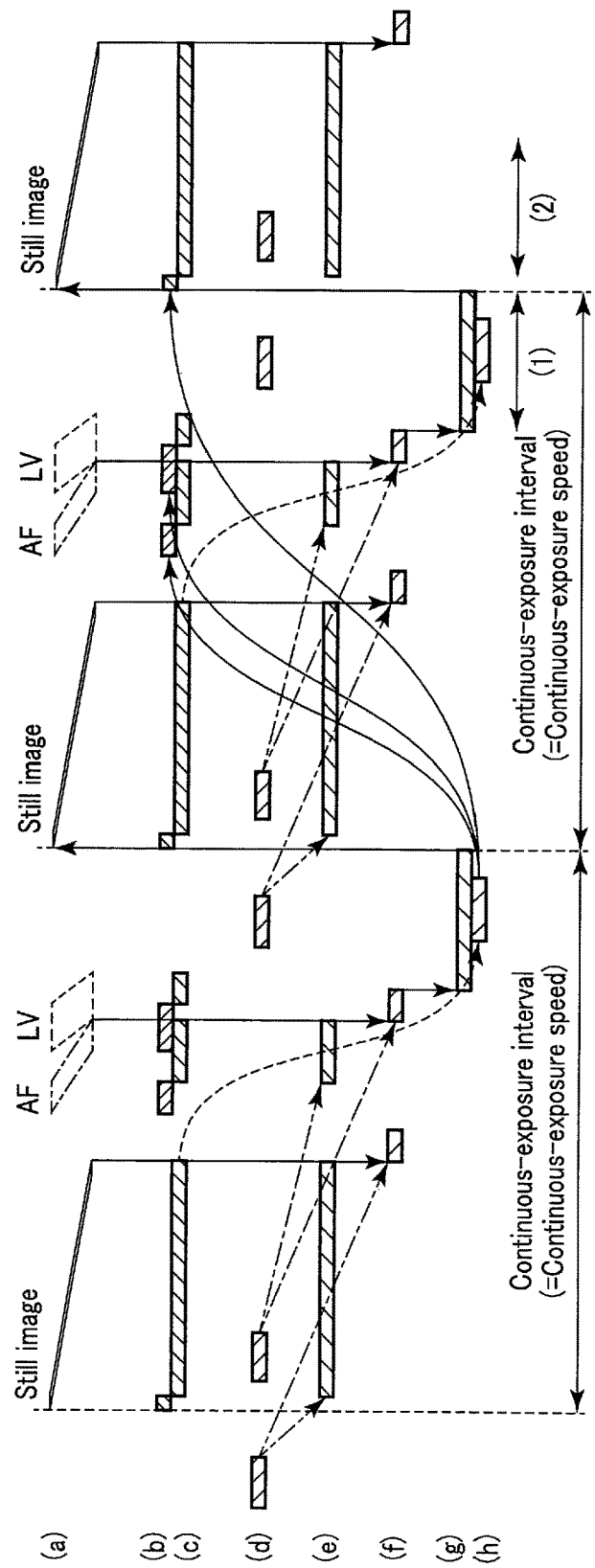
F I G. 10

FOCUS DETECTION APPARATUS AND FOCUS DETECTION METHOD

CROSS-REFERENCE TO RELATED APPLICATIONS

This application is based upon and claims the benefit of priority from the prior Japanese Patent Application No. 2016-248389, filed Dec. 21, 2016, the entire contents of which are incorporated herein by reference.

BACKGROUND OF THE INVENTION

1. Field of the Invention

The present invention relates to a focus detection apparatus and a focus detection method.

2. Description of the Related Art

An imaging device (focus detection apparatus) that detects a focus state using some of the pixels of an imaging element as focus detection elements is known. Such a focus detection apparatus configures certain pixels of an imaging element as focus detection pixels, forms an image on the focus detection pixels from subject light fluxes that have passed through different pupil areas symmetrical with respect to the center of the optical axis of an imaging optical system, and detects a phase difference between the subject light fluxes to thereby detect a focus state of the imaging optical system.

In an imaging apparatus, it is known that the amount of light fluxes incident through an imaging optical system decreases as the distance from the optical axis of the imaging optical system increases, by virtue of optical characteristics of the imaging optical system. This causes unevenness in illuminance of a subject image formed on an imaging element. The focus adjustment apparatus disclosed in Jpn. Pat. Appln. KOKAI Publication No. 2015-72357 proposes calculating optical parameters to correct such unevenness in illuminance, and performing illuminance correction using the optical parameters.

BRIEF SUMMARY OF THE INVENTION

According to a first aspect of the invention, there is provided a focus detection apparatus comprising: an imaging element that includes a plurality of focus detection pixels and that images a subject via an imaging optical system; a correction value calculation unit that calculates a correction value based on an optical state, the correction value being used to correct pixel signals output from the focus detection pixels, the optical state being associated with light fluxes from the subject incident on the focus detection pixels; a correction unit that corrects the pixel signals output from the focus detection pixels using the correction value; and a focus detection unit that performs focus detection based on the corrected pixel signals, wherein the correction value calculation unit calculates the correction value based on the optical state, the optical state is a state of before the imaging element performs imaging for still image capturing or imaging for focus detection, and the correction unit performs correction using the correction value simultaneously with reading the pixel signals from the focus detection pixels subsequent to the imaging for the still image capturing or the imaging for the focus detection by the imaging element.

According to a second aspect of the invention, there is provided a focus detection method comprising: causing an imaging element that includes a plurality of focus detection pixels to image a subject via an imaging optical system; calculating a correction value based on an optical state, the correction value being used to correct pixel signals output from the focus detection pixels, the optical state being associated with light fluxes from the subject incident on the focus detection pixels; correcting the pixel signals output from the focus detection pixels using the correction value; and performing focus detection based on the corrected pixel signals, wherein the calculating of the correction value includes calculating the correction value based on the optical state, the optical state is a state of before the imaging element performs imaging for still image capturing or imaging for focus detection, and the correcting includes performing correction using the correction value simultaneously with reading the pixel signals from the focus detection pixels subsequent to the imaging for the still image capturing or the imaging for the focus detection by the imaging element.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute apart of the specification, illustrate embodiments of the invention, and together with the general description given above and the detailed description of the embodiments given below, serve to explain the principles of the invention.

FIG. 1 is a block diagram showing an example of a configuration of an imaging device that includes a focus detection apparatus, according to an embodiment of the present invention.

FIG. 2B is a flowchart showing an operation of the imaging device according to an embodiment of the present invention.

FIG. 10 is a timing chart according to a modification in which an AE computation is performed at a timing of driving a focus lens and an aperture.

DETAILED DESCRIPTION OF THE INVENTION

Figure 2A:
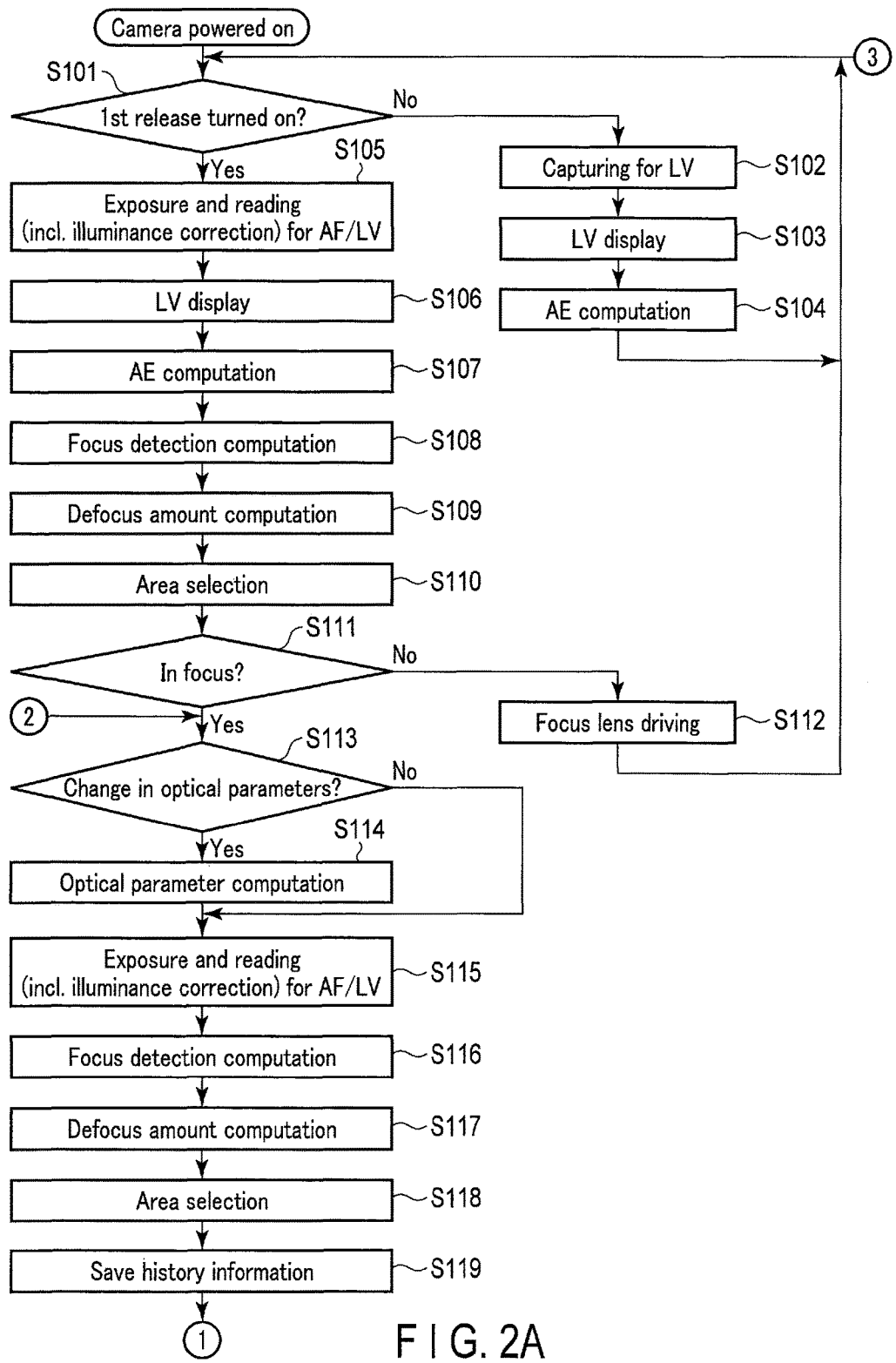
FIG. 2A is a flowchart showing an operation of the imaging device according to an embodiment of the present invention.

Hereinafter, an embodiment of the present invention will be explained with reference to the accompanying drawings. FIG. 1 is a block diagram showing an example of a configuration of an imaging device, which includes a focus detection apparatus, according to an embodiment of the present invention. In FIG. 1, solid lines with arrows indicate the flow of data, and broken lines with arrows indicate the flow of control signals.

As shown in FIG. 1, an imaging device 1 includes an interchangeable lens 100 and a camera main body 200. The interchangeable lens 100 is configured to be detachable from the camera main body 200. When the interchangeable lens 100 is attached to the camera main body 200, they are communicably connected to each other. The imaging device 1 is not necessarily a lens-exchangeable imaging device. For example, the imaging device 1 may be a lens-integrated imaging device.

The interchangeable lens 100 comprises an imaging optical system 102, a driver 104, a lens CPU 106, and a lens-side storage unit 108. Blocks of the interchangeable lens 100 are constituted by, for example, hardware. However, the blocks are not necessarily constituted by hardware, and some of the blocks may be constituted by software. Also, each block of the interchangeable lens 100 does not need to be constituted by a single item of hardware or software, and may be constituted by a plurality of items of hardware or software.

The imaging optical system 102 is an optical system that forms light fluxes from a subject into an image on an imaging element 208 of the camera main body 200. The imaging optical system 102 includes a focus lens 1021 and an aperture 1022. The focus lens 1021 is configured to move in an optical axis direction to adjust the focus position of the imaging optical system 102.

The aperture 1022 is disposed on the optical axis of the focus lens 1021. The diameter of the aperture 1022 is variable. The aperture 1022 adjusts the amount of light fluxes from a subject incident on the imaging element 208 after passing through the focus lens 1021. The driver 104 drives the focus lens 1021 and the aperture 1022 based on control signals output from the lens CPU 106. The imaging optical system 102 may be configured as a zoom lens. In this case, the driver 104 also performs zoom driving.

The lens CPU 106 is configured to communicate with a CPU 218 of the camera main body 200 via an interface (I/F) 110. The lens CPU 106 controls the driver 104 in accordance with the control of the camera main body 200 by the CPU 218. The lens CPU 106 sends information such as an aperture value (f-number) of the aperture 1022 and lens information stored in the lens-side storage unit 108 to the CPU 218 via the I/F 110. The lens CPU 106 is not necessarily configured as a CPU. That is, functions similar to those of the lens CPU 106 may be implemented by ASIC, FPGA, or the like. Furthermore, functions similar to those of the lens CPU 106 may be implemented by software.

The lens-side storage unit 108 stores lens information about the interchangeable lens 100. The lens information includes, for example, information about the focal length of the imaging optical system 102 and information about aberration.

The camera main body 200 includes a mechanical shutter 202, a driver 204, an operation unit 206, the imaging element 208, a camera shake correction circuit 210, an imaging control circuit 212, an analog processor 214, an analog-to-digital converter (ADC) 216, the CPU 218, an image processor 220, an image compression/expansion unit 222, a focus detection circuit 224, an optical parameter calculation circuit 226, an illuminance correction circuit 228, an exposure control circuit 230, a display 232, a bus 234, a DRAM 236, a body-side storage unit 238, and a recording medium 240. Each block of the camera main body 200 is constituted by, for example, hardware. However, the blocks of the camera main body 200 are not necessarily constituted by hardware, and some of the blocks may be constituted by software. Also, each block of the camera main body 200 does not need to be constituted by a single item of hardware or software, and may be constituted by a plurality of items of hardware or software.

The mechanical shutter 202 is configured to be openable and closable to adjust the period of time during which light fluxes from a subject is incident on the imaging element 208 (exposure time of the imaging element 208). A focal-plane shutter, for example, may be employed as the mechanical shutter 202. The driver 204 drives the mechanical shutter 202 on the basis of a control signal from the CPU 218.

The operation unit 206 includes various operational buttons such as a power supply button, a release button, a movie button, a replay button, and a menu button, as well as various operational components such as a touch panel. The operation unit 206 detects the operational states of the various operational components and outputs signals indicative of the detection results to the CPU 218.

The imaging element 208 is disposed at a position behind the mechanical shutter 202 on the optical axis of the imaging optical system 102, where the imaging optical system 102 forms an image from light fluxes from the subject. The imaging element 208 includes a light receiving surface with a two-dimensional array of pixels. Each pixel is constituted by, for example, a photodiode, and generates an electric charge according to the amount of received light fluxes. The electric charges generated at the pixels are stored in capacitors connected to the respective pixels. The electric charges stored in the capacitors are read as pixel signals in accordance with control signals from the imaging control circuit 212. In the present embodiment, the pixels include focus detection pixels. Each of the focus detection pixels is a pixel configured to receive a light flux from only one of a pair of pupil areas of the imaging optical system 102. To receive a light flux from only one of the pair of pupil areas, each of the focus detection pixels is configured to light-shield a part of the area with a light-shielding film. Alternatively, each of the focus detection pixels may be configured in such a manner that a light flux from only one of the pair of pupil areas is received by the pupil division method that uses a microlens.

The camera shake correction circuit 210 moves the imaging element 208 in a direction parallel to its light receiving surface to prevent a camera shake that may occur in the camera main body 200. The movement of the imaging element 208 upon occurrence of a camera shake suppresses blur of the subject image that may be caused in image data by the camera shake. The camera shake correction circuit may be provided in the interchangeable lens 100. In this case, the camera shake correction circuit is configured to move a camera shake correction optical system included in the imaging optical system 102.

The imaging control circuit 212 controls imaging (exposure) of the imaging element 208 and reading of the pixel signals from the imaging element 208, in accordance with the setting of reading the pixel signals from the imaging element 208.

The analog processor 214 performs analog processing such as amplification processing on the pixel signals read from the imaging element 208, in accordance with the control by the imaging control circuit 212.

The ADC 216 converts the pixel signals output from the analog processor 214 into digital pixel data. In the explanation given below, a set of pixel data will be referred to as image data.

The CPU 218 is a controller that performs control of the entire camera main body 200 in accordance with a program stored in the body-side storage unit 238. The CPU 218 controls imaging by the imaging element 208 via, for example, the imaging control circuit 212. In accordance with the focus state of the focus lens 1021 detected by the focus detection circuit 224, the CPU 218 outputs a control signal for driving the focus lens 1021 to the lens CPU 106. The CPU 218 outputs an exposure setting value calculated by the exposure control circuit 230 to the lens CPU 106 and the imaging control circuit 212. The CPU 218 is not necessarily configured as a CPU. That is, functions similar to those of the CPU 218 may be implemented by ASIC, FPGA, or the like. Furthermore, functions similar to those of the CPU 218 may be implemented by software.

The image processor 220 performs various kinds of image processing on the image data. To record still images, for example, the image processor 220 performs image processing for still image recording. Similarly, to record moving images, the image processor 220 performs image processing for moving image recording. To perform live-view display, the image processor 220 performs image processing for display.

In image data recording, the image compression/expansion unit 222 compresses the image data (still image data or moving image data) generated by the image processor 220. In image data reproduction, the image compression/expansion unit 220 expands the image data recorded in the recording medium 240 in a compressed state.

The focus detection circuit 224 as a focus detection unit performs focus detection of the focus lens 1021 by the known phase difference method, using the pixel data of the focus detection pixels of the imaging element 208. The optical parameter calculation circuit 226 as a correction value calculation unit is constituted by a DSP, for example, and performs an optical parameter computation to calculate, for example, an illuminance correction value for illuminance correction. The illuminance correction circuit 228 as a correction unit performs an illuminance correction to pixel data acquired from the focus detection pixels, in accordance with the illuminance correction value calculated by the optical parameter calculation circuit 226. The focus detection circuit 224, the optical parameter calculation circuit 226, and the illuminance correction circuit 228 will be explained in detail later.

The exposure control circuit 230 as an exposure control unit calculates an exposure setting value on the basis of pixel data (including focus detection pixels) of the imaging element 208. The exposure setting value includes a stop size (aperture value) of the aperture 1022 and the exposure time (shutter speed) of the imaging element 208.

The display 232 is a display unit such as a liquid crystal display or an organic EL display, and disposed at, for example, the back of the camera main body 200. The display 232 displays images under the control of the CPU 218. The display 232 is used for live-view display, recorded image display, and the like.

The bus 234 is connected to the ADC 216, the CPU 218, the image processor 220, the image compression/expansion unit 222, the focus detection circuit 224, the optical parameter calculation circuit 226, the illuminance correction circuit 228, the exposure control circuit 230, the display 232, the DRAM 236, the body-side storage unit 238, and the recording medium 240, and functions as a transfer path for transferring various data generated in these blocks.

The DRAM 236 is an electrically rewritable memory, and temporarily stores various kinds of data, such as image data output from the imaging element 208, image data for recording, image data for display, and processed data in the CPU 218. An SDRAM may also be employed for temporary storage.

The body-side storage unit 238 stores programs used in the CPU 218, and various types of data such as adjustment values of the camera main body 200. The recording medium 240 is configured to be embedded in or inserted into the camera main body 200, and records the image data for recording as an image file of a predetermined format. Each of the DRAM 236, the body-side storage unit 238, and the recording medium 240 may be constituted by a single memory or the like, or by a combination of multiple memories or the like.

Hereinafter, an operation of the imaging device 1 of the present embodiment will be explained. FIGS. 2A and 2B are flowcharts showing operations of the imaging device according to the present embodiment. The operations shown in FIGS. 2A and 2B are started when a power-on operation of the imaging device 1 by the user is detected. Upon detection of the power-on operation, the CPU 218 determines whether or not a first release switch of a release button is turned on at step S101. The first release switch is a switch that is turned on in response to, for example, a half-press operation of the release button by the user. If it is determined at step S101 that the first release switch is turned on, the processing advances to step S105. If it is determined at step S101 that the first release switch is not turned on, the processing advances to step S102.

At step S102, the CPU 218 captures image data for live-view (LV) display. At this time, the CPU 218 outputs a control signal to the driver 204 to make the mechanical shutter 202 fully open, and outputs a control signal to the lens CPU 106 to drive the aperture 1022 by a predetermined amount (e.g., open aperture). After that, the CPU 218 outputs a control signal to the imaging control circuit 212 to allow the imaging element 208 to start imaging for live-view display. This imaging is performed, for example, for each pixel of a predetermined row of the imaging element 208. Whenever imaging for live-view display of a predetermined row is completed, the imaging control circuit 212 starts reading pixel signals from the imaging element 208. The read pixel signals are converted into pixel data by the ADC 216, and then stored in the DRAM 236.

At step S103, the CPU 218 performs live-view (LV) display. At this time, the CPU 218 causes the image processor 220 to generate image data for display. In response thereto, the image processor 220 performs correction processing on the pixel data from the focus detection pixels. This correction processing allows the pixel data from the focus detection pixels to be used for live-view display in a manner similar to the pixel data from other normal pixels. After this correction processing, the image processor 220 performs other processing required for generating image data for live-view display to generate image data for display. The CPU 218 causes the display 232 to display live-view (LV) images based on the image data for display generated by the image processor 220. After that, the processing advances to step S104.

At step S104, the CPU 218 causes the exposure control circuit 230 to perform an AE computation. In response thereto, the exposure control circuit 230 calculates an exposure setting value (aperture value) from image data stored in the DRAM 236 at step S102. The CPU 218 outputs the calculated exposure setting value to the lens CPU 106. After that, the processing returns to step S101. As a result of the processing at step S104, image data for the next live-view display is captured in accordance with the exposure setting value calculated at step S104.

At step S105, the CPU 218 performs imaging and reading for autofocusing (AF) and live-view (LV) display. The CPU 218 outputs a control signal to the imaging control circuit 212 to cause the imaging element 208 to start imaging for autofocusing. The exposure time in imaging for autofocusing may be different from the exposure time in imaging for live-view display. This imaging is performed, for example, for each pixel of a predetermined row of the imaging element 208. Whenever the imaging for autofocusing of a predetermined row is completed, the imaging control circuit 212 starts reading pixel signals from the imaging element 208. In this case, the CPU 218 inputs the pixel data of the focus detection pixels stored in the DRAM 236 to the illuminance correction circuit 228. In response thereto, the illuminance correction circuit 228 performs an illuminance correction to the pixel data of the focus detection pixels. An illuminance correction is performed by, for example, multiplying each item of pixel data by an illuminance correction value calculated for each item of pixel data. This illuminance correction value is calculated by an optical parameter computation by the optical parameter calculation circuit 226. An optical parameter computation is a convolutional integral of incidence angle characteristics of the light rays passing through the imaging optical system 102, which are information about the light fluxes from the subject, and incidence angle characteristics of the imaging element 208. Optical parameters that determine the incidence angle characteristics of the light rays passing through the imaging optical system 102 and the incidence angle characteristics of the imaging element 208 include parameters indicative of various optical states, such as the aperture value, the pupil position, the zoom state, and the focus lens position (state of the subject distance), which are specified in the interchangeable lens 100, and the state of camera shake correction (an amount of movement from the initial position of the imaging element 208 or the camera shake correction optical system), the image height, and the AF detection direction, which are specified in the camera main body 200. Since an optical parameter computation includes a convolutional integral, the optical parameter calculation circuit 226 should desirably be constituted by a DSP. The pixel signals subjected to an illuminance correction are converted into pixel data at the ADC 216, and then stored in the DRAM 236. After completion of pixel signal reading for autofocusing, the CPU 218 outputs a control signal to the imaging control circuit 212 to cause the imaging element 208 to start imaging for live-view display. Whenever imaging for live-view display of a predetermined row is completed, the imaging control circuit 212 starts reading pixel signals from the imaging element 208. The read pixel signals are converted into pixel data at the ADC 216, and then stored in the DRAM 236.

At step S106, the CPU 218 performs live-view (LV) display, in a manner similar to step S103.

At step S107, the CPU 218 causes the exposure control circuit 230 to perform an AE computation. At step S107, an exposure setting value may be calculated for each of imaging for autofocusing and imaging for live-view display.

At step S108, the CPU 218 causes the focus detection circuit 224 to perform a focus detection computation. The focus detection circuit 224 performs a correlation computation of a pair of focus detection pixels, using the pixel data of the focus detection pixels subjected to the illuminance correction and stored in the DRAM 236.

During the focus detection computation, the focus detection circuit 224 evaluates the reliability of focus detection. In the present embodiment, a reliability evaluation is performed during the focus detection computation, and a defocus amount computation is performed only on a highly reliable AF area. It is thereby possible to improve the accuracy in focus adjustment and to reduce the computation load, while performing focus detection at multiple points. Hereinafter, the reliability evaluation will be explained.

The focus detection circuit 224 performs a reliability evaluation on the basis of correlation values obtained by the correlation computation.

Figure 3:
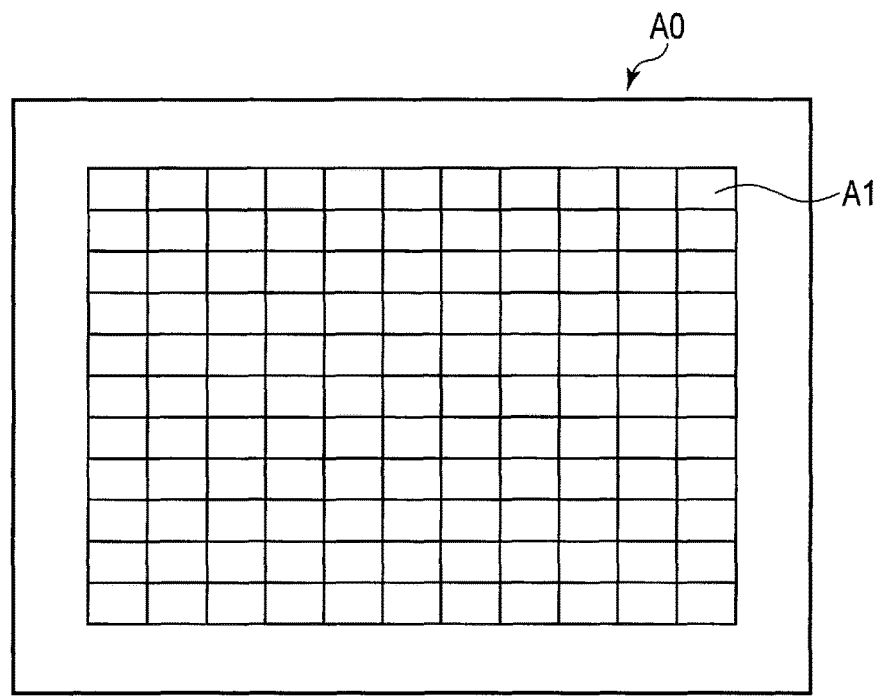
FIG. 3 is a schematic diagram showing an example of AF areas.

FIG. 3 is a schematic diagram showing an example of AF areas. In the example of FIG. 3, an AF area A0 includes 121 AF areas A1. Eleven AF areas A1 are disposed in each of the longitudinal and lateral directions in the screen. In the present embodiment, a reliability evaluation is performed for each of the 121 AF areas A1. Depending on the array pattern of the focus detection pixels, focus detection may be performed in each of the two AF detection directions, namely, the longitudinal and lateral directions, for each AF area A1. In this case, reliability evaluation may be performed in the longitudinal and lateral directions for the 121 AF areas A1.

In the reliability evaluation, the following conditions (1)-(3) are evaluated. When an AF area satisfies all of the conditions (1)-(3), it is determined that the reliability of the AF area is high. After the reliability evaluation, the processing advances to step S109.

(1) Whether or not the contrast obtained from the pixel data of the focus detection pixels is sufficiently high.

(2) Whether or not the local minimum value of correlation values is sufficiently small.

(3) Whether or not a gradient of the local minimum value of the correlation values and a greater one of correlation values adjacent to the local minimum value is sufficiently high (whether or not the periphery of the local minimum value of the correlation values is sharp-edged).

Herein, the conditions for the reliability evaluation are not limited to the above-described three conditions, and other conditions may be added, or some of the three conditions may be omitted. A determination as to whether or not each AF area satisfies the conditions may be performed by calculating, as numerical values, the extent to which the conditions are satisfied. In this case, if the sum of the numerical values calculated for an AF area is large, for example, it is determined that the reliability of the AF area is high.

Reference will be made back to FIGS. 2A and 2B. At step S109, the focus detection circuit 224 performs a defocus amount computation. That is, the focus detection circuit 224 calculates a defocus amount from the focus position of the focus lens 1021, based on a spacing value between two images in an AF area determined as being highly reliable (an image shift amount corresponding to the extreme value of the correlation values) as a result of the reliability evaluation at step S108. Specifically, the focus detection circuit 224 calculates a defocus amount by multiplying the spacing value between two images by a sensitivity value that is different according to the AF area and the AF detection direction. The sensitivity value is calculated by an optical parameter computation at the optical parameter calculation circuit 226, in a manner similar to the illuminance correction value, and is a conversion coefficient used to convert the spacing value between two images (an image phase difference amount) into a defocus amount. After calculation of the defocus amount, the focus detection circuit 224 adds, to the defocus amount, a contrast shift correction value of the imaging optical system 102 (approximately the frequency shift amount of the imaging optical system 102), which is a correction value that is different according to the AF area. The focus detection circuit 224 further performs a process of converting the defocus amount into a focus lens position (lens pulse position). After that, the processing advances to step S110.

At step S110, the focus detection circuit 224 performs area selection processing to select an AF area corresponding to the focus lens position used to drive the focus lens 1021. After the area selection processing, the processing advances to step S111. The area selection processing is performed by, for example, selecting an AF area indicative of a focus lens position corresponding to the shortest subject distance (i.e., the closest focus lens position). Hereinafter, an example of the area selection processing will be explained in brief.

Figure 4:
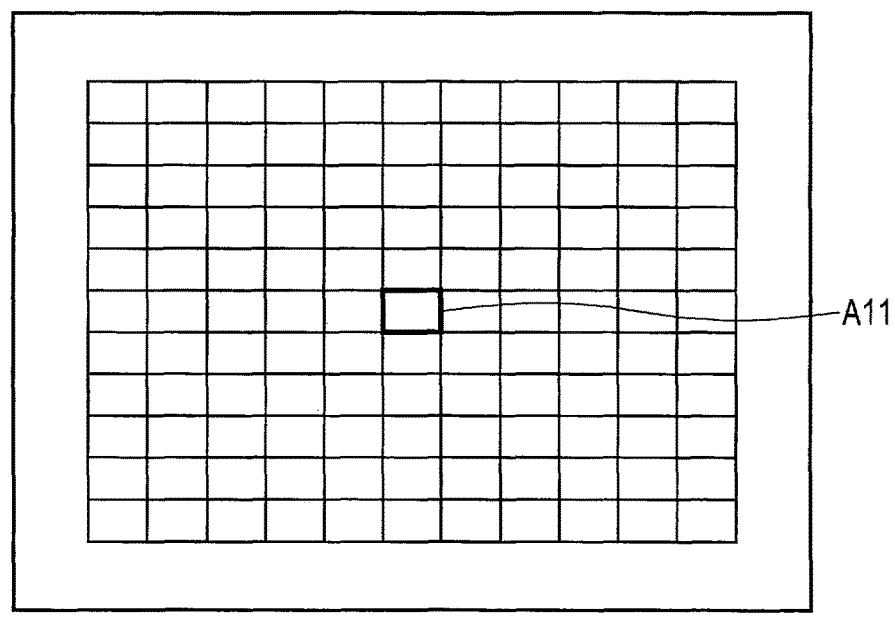
FIG. 4 is a diagram illustrating AF area selection processing when the AF mode is a single-target mode.

FIG. 4 is a diagram illustrating AF area selection processing when the AF mode is a single-target mode. The single-target mode is a mode that performs autofocusing on an AF area A11 specified by the user, from among the 121 AF areas. That is, the AF area is selected in the single-target mode. Accordingly, in the single-target mode, an AF direction indicative of a focus lens position corresponding to the shortest distance is selected from the AF directions in the specified AF area A11.

Figure 5A:
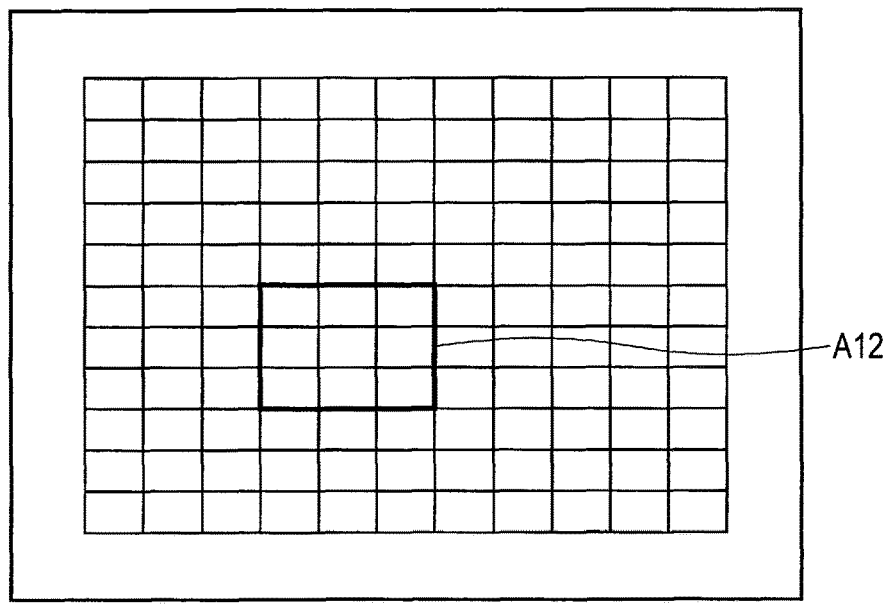
FIG. 5A is a diagram illustrating AF selection processing when the AF mode is a group-target mode.
Figure 5B:
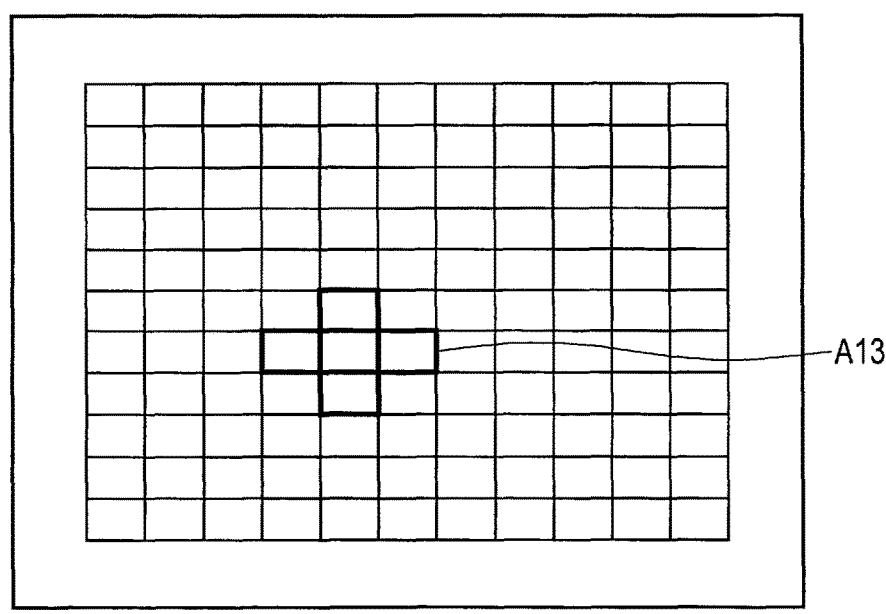
FIG. 5B is a diagram illustrating AF selection processing when the AF mode is the group-target mode.

FIGS. 5A and 5B are diagrams illustrating AF selection processing when the AF mode is a group-target mode. The group-target mode is a mode that performs autofocusing on a group of AF areas specified by the user, from among the 121 AF areas. Examples of this group include a rectangular group A12 constituted by nine AF areas shown in FIG. 5A, and a cross-shaped group A13 constituted by five AF areas shown in FIG. 5B. In the group-target mode, an AF area and an AF direction indicative of a focus lens position corresponding to the shortest distance are selected from the specified group A12 or A13.

Figure 6:
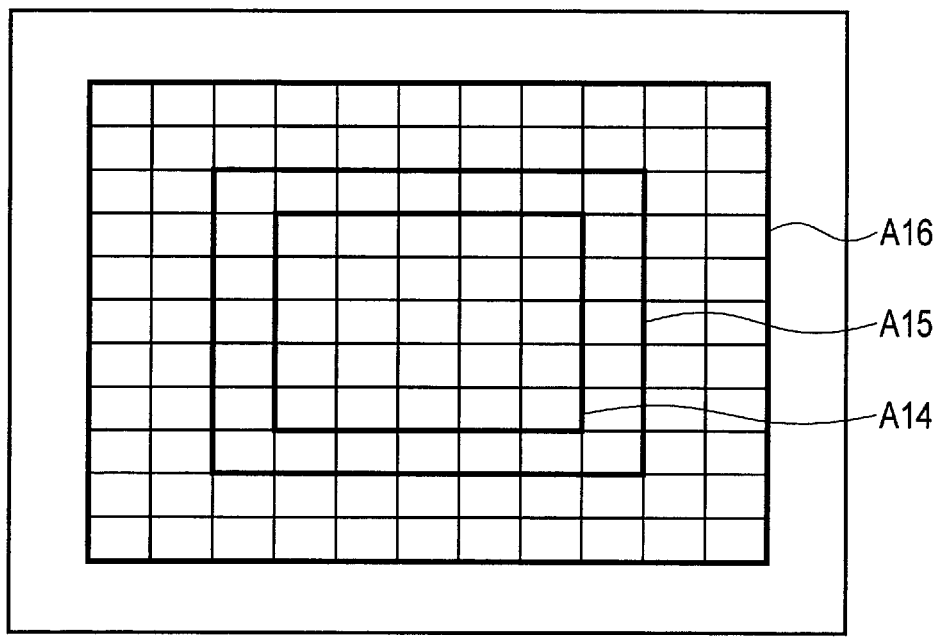
FIG. 6 is a diagram illustrating AF selection processing when the AF mode is an all-target mode.

FIG. 6 is a diagram illustrating AF selection processing when the AF mode is an all-target mode. In the all-target mode, an AF area is selected with a high priority given to the center. Specifically, an AF area is selected from an AF area A14 including 25 central AF areas enclosed by the heavy line in FIG. 6. If a plurality of highly reliable AF areas are present in the AF areas A14, an AF area and an AF direction indicative of a focus lens position corresponding to the shortest distance are selected therefrom. If no AF areas in the AF areas A14 are highly reliable, an AF area is selected from an AF area A15 including 49 central AF areas enclosed by the heavy line in FIG. 6. If a plurality of highly reliable AF areas are present in the AF area A15, an AF area and an AF direction indicative of a focus lens position corresponding to the shortest distance are selected therefrom. If no AF areas in the AF area A15 are highly reliable, an AF area is selected from another AF area A16. If a plurality of highly reliable AF areas are present in the AF area A16, an AF area and an AF direction indicative of a focus lens position corresponding to the shortest distance are selected therefrom.

The area selection processing is not limited to the method of selecting an AF area indicative of the closest focus lens position. For example, a method of selecting the most highly reliable AF area may be used as the area selection processing. Furthermore, when area selection processing is performed after a moving object prediction computation, which will be described later, a method of selecting an AF area indicative of a focus lens position according to the moving object prediction equation may be used.

Reference will be made back to FIGS. 2A and 2B. At step S111, the CPU 218 determines whether or not the focus lens 1021 is in focus. The determination at step S111 is performed by, for example, determining whether or not the defocus amount (difference between the current focus lens position and the selected focus lens position) in the AF area selected in the area selection processing is within a predetermined permissible range. If the defocus amount is within the permissible range, it is determined that the focus lens 1021 is in focus. If it is determined at step S111 that the focus lens 1021 is out of focus, the processing advances to step S112. If it is determined at step S111 that the focus lens 1021 is in focus, the processing advances to step S113.

At step S112, the CPU 218 outputs a control signal to the lens CPU 106 to drive the focus lens 1021 in accordance with the focus lens position calculated for the AF area selected at step S110. In response to the control signal, the lens CPU 106 drives the focus lens 1021 via the driver 104. After that, the processing returns to step S102.

At step S113, the CPU 218 determines, at step S113, whether or not there is a change in the optical parameters. At step S113, if any of the optical parameters such as the aperture value, the focus lens position, the zoom state, and the camera shake correction state has changed to an extent that affects the illuminance correction value, the sensitivity value, or the like, it is determined that there is a change in the optical parameters. If it is determined at step S113 that there is a change in the optical parameters, the processing advances to step S114. If it is determined at step S113 that there is no change in the optical parameters, the processing advances to step S115.

At step S114, the CPU 218 causes the optical parameter calculation circuit 226 to perform an optical parameter computation. The processing at step S114 is performed at a predetermined timing that will be explained later. Although not illustrated in FIG. 2A, the determination about the change in optical parameters at step S113 and the optical parameter computation at step S114 may be performed during the focus lens driving at step S112, as will be described later.

The CPU 218 performs, at step S115, imaging and pixel signal reading for autofocusing, and imaging and pixel signal reading for live-view (LV) display, in a manner similar to step S105. At step S115, the pixel signals of the focus detection pixels that are sequentially read in accordance with the imaging for autofocusing are converted into pixel data at the ADC 216 and input to the illuminance correction circuit 228. In response thereto, the illuminance correction circuit 228 performs an illuminance correction to the pixel data of the focus detection pixels. Thus, in the present embodiment, an illuminance correction is performed simultaneously with the reading subsequent to the imaging for autofocusing.

At step S116, the CPU 218 causes the focus detection circuit 224 to perform a focus detection computation. In response thereto, the focus detection circuit 224 performs a reliability evaluation in a manner similar to step S108. After that, at step S117, the focus detection circuit 224 performs a defocus amount computation, in a manner similar to step S109. At step S118, the focus detection circuit 224 performs area selection processing similar to that of step S110.

At step S119, the CPU 218 causes the DRAM 236, for example, to store history information used for a moving object prediction computation. The history information is, for example, a focus lens position (lens pulse position) corresponding to the AF area selected in the area selection processing. The number of focus lens positions stored as the history information may be suitably set.

At step S120, the CPU 218 determines whether or not a second release switch is turned on. The second release switch is a switch that is turned on in response to, for example, a full-press operation of the release button by the user. If it is determined at step S120 that the second release switch is turned on, the processing advances to step S123. If it is determined at step S120 that the second release switch is not turned on, the processing advances to step S121.

At step S121, the CPU 218 determines whether or not the focus lens 1021 is in focus, in a manner similar to step S111. If it is determined at step S121 that the focus lens 1021 is out of focus, the processing advances to step S122. If it is determined at step S121 that the focus lens 1021 is in focus, the processing returns to step S113.

At step S122, the CPU 218 outputs a control signal to the lens CPU 106 in such a manner that the focus lens 1021 is driven in accordance with the focus lens position calculated at step S117. In response to the control signal, the lens CPU 106 drives the focus lens 1021 via the driver 104. After that, the processing returns to step S113. The determination about the change in optical parameters at step S113 and the optical parameter computation at step S114 may be performed in parallel during the focus lens driving at step S122.

At step S123, the CPU 218 causes the focus detection circuit 224 to perform a moving object prediction computation. In response thereto, the focus detection circuit 224 performs a moving object prediction computation. The moving object prediction computation is a process of predicting the next position at which the focus lens 1021 is to be driven from the history of results (focus lens positions) of the past defocus amount computations.

At step S124, the CPU 218 starts operating the mechanical shutter 202 to perform imaging (main exposure) for still image capturing. The operations of the mechanical shutter 202 include an opening and closing operation of the mechanical shutter 202 before and after the main exposure, and a full-open operation of the mechanical shutter 202 to start imaging for live view and imaging for autofocusing after the main exposure. First, the CPU 218 switches the control signal of the driver 204 to make the mechanical shutter 202 fully closed. After performing the main exposure at step S126, the CPU 218 controls the driver 204 to make the mechanical shutter 202 fully open.

At step S125, the CPU 218 instructs the lens CPU 106 to simultaneously drive the focus lens 1021 (driving of LD) and the aperture 1022 to start an operation. The driving position of the focus lens 1021 is the position predicted by the moving object prediction computation at step S123. The stop size of the aperture 1022 is a stop size corresponding to the exposure setting value (aperture value) calculated by the latest AE computation.

At step S126, the CPU 218 starts main exposure. The main exposure is imaging to acquire image data for recording. In the main exposure, the CPU 218 controls the driver 204 to open and close the mechanical shutter 202 only for a predetermined exposure period necessary for continuously capturing still images. The CPU 218 causes the imaging element 208 to start imaging only for the exposure period. After the exposure period ends, the imaging control circuit 212 reads pixel signals from the pixels of the imaging element 208. After the pixel signal reading, the CPU 218 causes the image processor 220 to perform processing to generate still image data for recording. In response thereto, the image processor 220 performs correction processing on the pixel data from the focus detection pixels. After the correction processing, the image processor 220 performs other processing necessary for generating the image data for recording to generate still image data for recording. After completion of the image processing, the CPU 218 causes the image compression/expansion unit 222 to compress the still image data for recording. After completion of the compression, the CPU 218 records the compressed still image data for recording as an image file in the recording medium 240. In the present embodiment, the pixel signals of the focus detection pixels are converted into pixel data at the ADC 216 subsequently to the imaging for the main exposure, and then input to the illuminance correction circuit 228. In response thereto, the illuminance correction circuit 228 performs illuminance correction to the pixel data of the focus detection pixels. Thus, in the present embodiment, illuminance correction is performed simultaneously with the pixel signal reading subsequent to the main exposure.

At step S127, the CPU 218 causes the exposure control circuit 230 to perform an AE computation. In response thereto, the exposure control circuit 230 calculates an exposure setting value (aperture value) from the image data stored in the DRAM 236 as a result of the main exposure of the last frame.

At step S128, the CPU 218 instructs the lens CPU 106 to drive the aperture 1022. The stop size of the aperture 1022 is a stop size corresponding to the exposure setting value (aperture value) calculated by the latest AE computation. Driving of the aperture 1022 at step S128 may be performed in parallel with the pixel signal reading subsequent to the main exposure. Although not shown in FIG. 2B, after completion of the pixel signal reading subsequent to the main exposure, the distance measurement computation (i.e., the focus detection computation and the defocus amount computation) is performed on the basis of the read pixel signals of the focus detection pixels subjected to the illuminance correction. The focus lens position calculated by the distance measurement computation is saved as history information for the moving object prediction computation.

At step S129, the CPU 218 determines whether or not the first release switch is turned on, in a manner similar to step S101. If it is determined at step S129 that the first release switch is turned on, the processing returns to step S113. If it is determined at step S129 that the first release switch is not turned on, the processing advances to step S130.

At step S130, the CPU 218 determines whether or not the camera main body 200 should be powered off. For example, if the user gives a power-off instruction by operating the operation unit 206, or if the user does not operate the operation unit 206 for a predetermined period of time, it is determined that the camera main body 200 should be powered off. If it is determined at step S130 that the camera main body 200 should not be powered off, the processing returns to step S101. If it is determined at step S130 that the camera main body 200 should be powered off, the processing ends.

Figure 7:
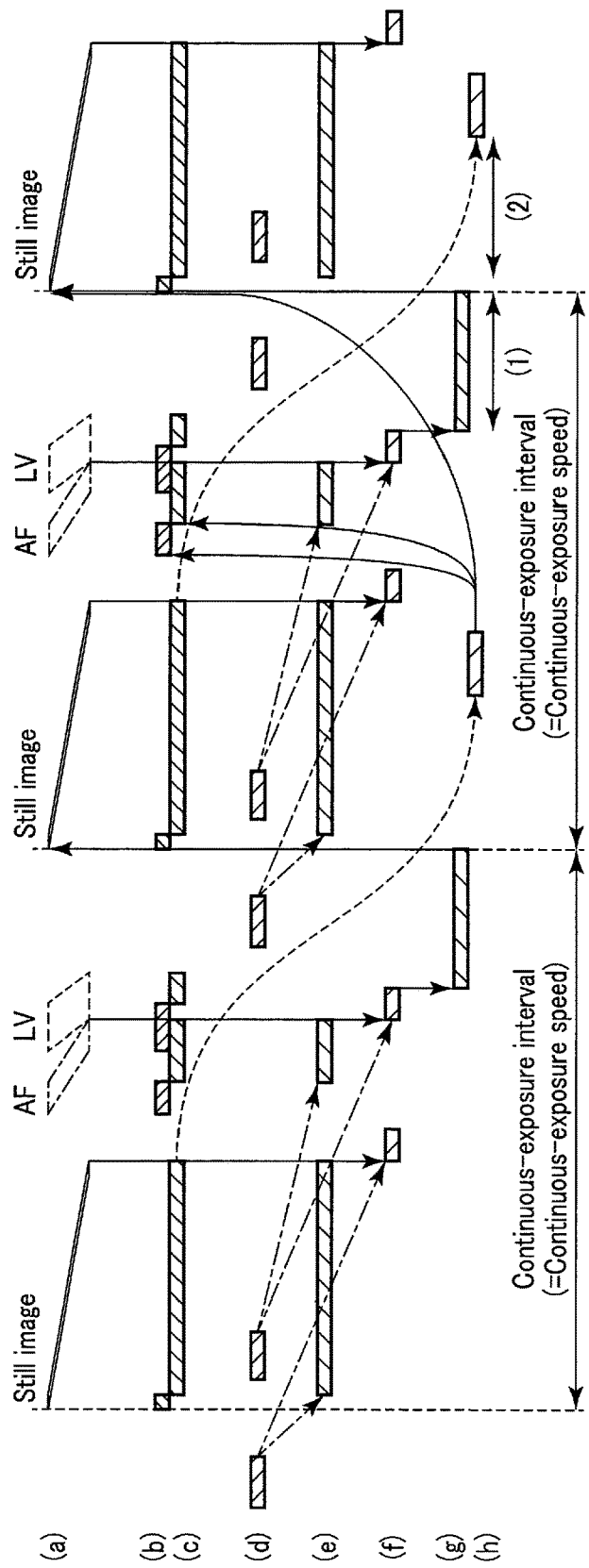
FIG. 7 is a timing chart showing an operation after continuous exposure is started.

Herein, the optical parameter computation and the illuminance correction will be explained in more detail. FIG. 7 is a timing chart illustrating an operation after continuous exposure is started (after the second release switch is turned on), according to the present embodiment. From the top in FIG. 7, (a) shows the exposure period in each of the imaging for the main exposure and autofocusing, and the imaging for live-view display, (b) shows the timing of start of exposure in each imaging, (c) shows the timing of pixel signal reading in each imaging, (d) shows the timing of optical parameter computation, (e) shows the timing of illuminance correction, (f) shows the timing of distance measurement computation (focus detection computation, defocus amount computation, and moving object prediction computation) and (g) shows the timing of driving the focus lens 1021 and the aperture 1022, and (h) shows the timing of AE computation. The arrows in the drawing indicate processing in which the calculated information is used. In FIG. 7, driving of the focus lens 1021 and the aperture 1022 and AE computation, prior to still image capturing (main exposure) of the first frame, are not shown.

As shown in FIG. 7, in a continuous-exposure mode, still images are captured every predetermined continuous-exposure interval while the second release switch is turned on. This continuous-exposure interval is determined by, for example, the number of continuous-exposure frames specified by the user.

Whenever a still image is captured, the focus lens 1021 and the aperture 1022 are driven in accordance with the results of the latest moving object prediction computation and AE computation. The main exposure is performed after completion of the driving of the focus lens 1021 and the aperture 1022. The main exposure is performed for a predetermined number of rows (e.g., for each row) of the imaging element 208. Whenever exposure of the predetermined row is completed, pixel signal reading is performed. After the pixel signal reading is completed, still image data is recorded. After the recording of the still image data is completed, imaging for autofocusing and imaging for live-view display are performed. Subsequently to the imaging for autofocusing and the imaging for live-view display, pixel signal reading is performed, and distance measurement computation and live-view display are performed. After that, the focus lens 1021 and the aperture 1022 are driven to perform the main exposure of the next frame.

When continuous exposure is started in this manner, the main exposure and the imaging for autofocusing and the imaging for live-view display are alternately performed. Accordingly, optical parameters such as the aperture value and the camera shake correction state may vary from moment to moment. When optical parameters have changed to an extent that affects, for example, the illuminance correction value, the optical parameter computation needs to be performed again. Since an optical parameter computation includes a convolutional integral, an optical parameter computation tends to be time-consuming, and may deteriorate the responsiveness in continuous exposure.

In the present embodiment, the optical parameter computation for the still image capturing (main exposure) is performed at the timing (period (1) in FIG. 7) of driving the focus lens 1021 and the aperture 1022, immediately before the main exposure, which is before the start of the still image capturing (main exposure) and after determination of the exposure setting value at the main exposure. If the illuminance correction value and the sensitivity value are calculated at this timing, illuminance correction can be performed simultaneously with the pixel signal reading subsequent to the main exposure that follows, and a distance measurement computation can be performed upon completion of the illuminance correction. That is, it is possible to eliminate the period of time during which only an optical parameter computation is performed, thus improving the responsiveness in continuous exposure.

In the present embodiment, an optical parameter computation for live-view display is performed at the timing (period (2) in FIG. 7) of the pixel signal reading subsequent to the main exposure. If the illuminance correction value and the sensitivity value are calculated at this timing, illuminance correction can be performed simultaneously with the pixel signal reading subsequent to the imaging for autofocusing that follows, and a distance measurement computation can be performed upon completion of the illuminance correction. In this case as well, it is possible to eliminate the period of time during which only an optical parameter computation is performed, thus improving the responsiveness in continuous exposure.

Furthermore, in the present embodiment, an AE computation is performed at the timing of the pixel signal reading subsequent to the main exposure. In this AE computation, image data acquired as a result of the main exposure of the last frame is used. By reflecting the result of this AE computation in both the still image capturing (main exposure) of the next frame and the imaging for live view, it is possible to improve the responsiveness in continuous exposure.

Next, optical parameters used in an optical parameter computation will be explained. Optical parameters used in a continuous-exposure optical parameter computation are basically the latest optical parameters at the time of performance of the optical parameter computation. For example, the aperture value is calculated in an AE computation of a previous frame. The focus lens position is calculated in the last distance measurement computation. The zoom state is a zoom position at the time of the optical parameter computation. The camera shake correction state is an amount of movement of the imaging element 208 or the camera shake correction optical system from the initial position at the time of the optical parameter computation.

Depending on the setting of the camera shake correction, initialization processing may be performed at a predetermined timing during continuous exposure. Initialization processing is processing to make the imaging element 208 or the camera shake correction optical system return to a predetermined initial position, prior to camera shake correction, to ensure a high accuracy of the camera shake correction. For example, it is desirable that initialization processing should be performed immediately before the main exposure. On the other hand, initialization processing does not need to be performed in live-view display during an interval between the main exposures, since performing initialization every time would reduce the responsiveness. When initialization processing is performed, it is desirable that an optical parameter computation should be performed, since the camera shake correction state (an amount of movement of the imaging element 208 or the camera shake correction optical system from the initial position) may greatly change.

In an optical parameter computation when camera shake correction initialization processing is performed, for example, for live-view display of the first frame immediately before or after the main exposure, it is desirable to use, as information about the camera shake state, information about the camera shake state at the time of initialization (i.e., zero amount of movement), instead of information about the latest camera shake state. Use of the latest information is not desirable for the purpose of preventing an optical parameter computation from being performed using information about the camera shake state during the initialization processing in the event of a failure in updating the information about the camera shake state. In an optical parameter computation at a timing when initialization processing is performed, fixedly using information about the camera shake state at the time of the initialization does not have much effect on the accuracy in the illuminance correction value or the sensitivity value.

Figure 8:
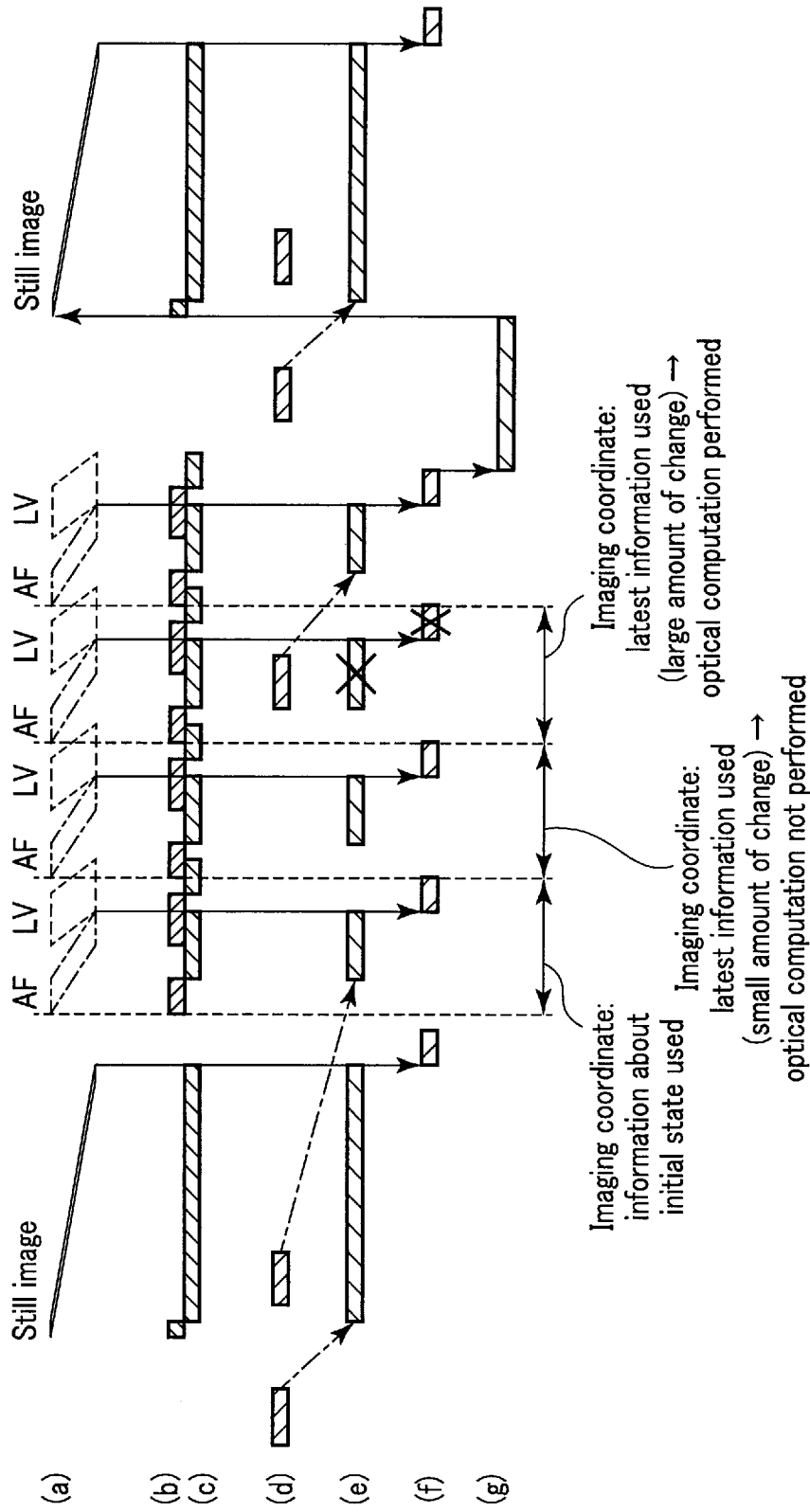
FIG. 8 is a timing chart showing an operation when live-view display of a plurality of frames is performed during an interval between still image capturing.

Depending on the setting of the continuous-exposure interval, live-view display of a plurality of frames may be performed during an interval between still image capturing, as shown in FIG. 8. Even when the setting is made to perform initialization processing, initialization processing is not performed for live-view display of the second and subsequent frames in most cases. In such cases, it is desirable to use information about the latest camera shake state as information about the camera shake state in an optical parameter computation.

If it is determined that there is a change in optical parameters, as shown in FIG. 8, it is desirable to perform an optical parameter computation at that point in time. During the performance of an optical parameter computation, it is desirable to not perform an illuminance correction or a distance measurement computation that follows, even if it is the timing of pixel signal reading subsequent to imaging for autofocusing (the timings indicated by the cross marks in FIG. 8). This is for the purpose of suppressing a deterioration in accuracy of focus detection as a result of the illuminance correction and the distance measurement computation that follows, in accordance with the optical parameters that have not been changed.

As described above, according to the present embodiment, it is possible to improve the responsiveness in continuous exposure without degrading the performance in focus detection, by performing an optical parameter computation at timings such as the timing of driving the focus lens 1021 and the aperture 1022 immediately before the main exposure, which is before the start of the still image capturing (main exposure) and after the determination of the exposure setting value at the main exposure, and the timing of pixel signal reading subsequent to the main exposure.

In the present embodiment, it is possible to improve the responsiveness in continuous exposure by performing an AE computation at the timing of pixel signal reading subsequent to the main exposure, when a distance measurement computation or the like is not performed, and reflecting the results of the AE computation in both the still image capturing (main exposure) of the next frame and the imaging for live view.

MODIFICATIONS

Figure 9:
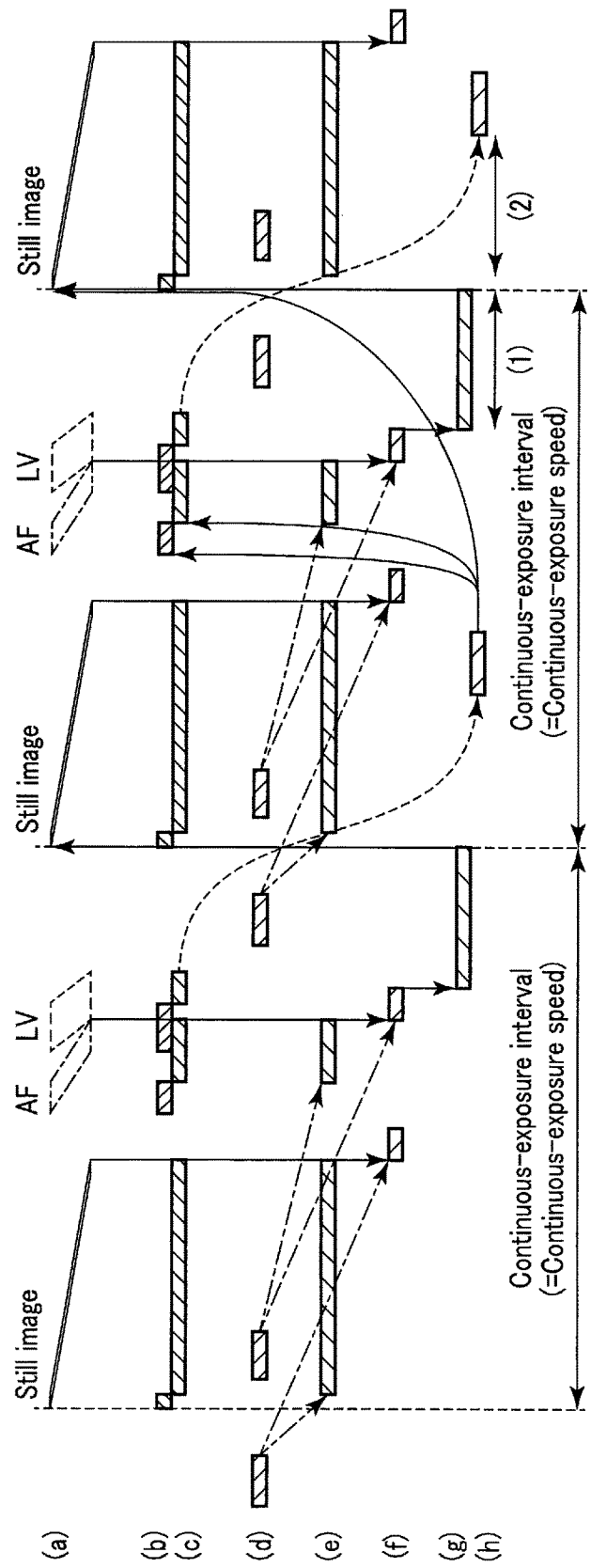
FIG. 9 is a timing chart according to a modification in which an AE computation is performed using image data acquired by the latest imaging for live-view display.
Figure 11:
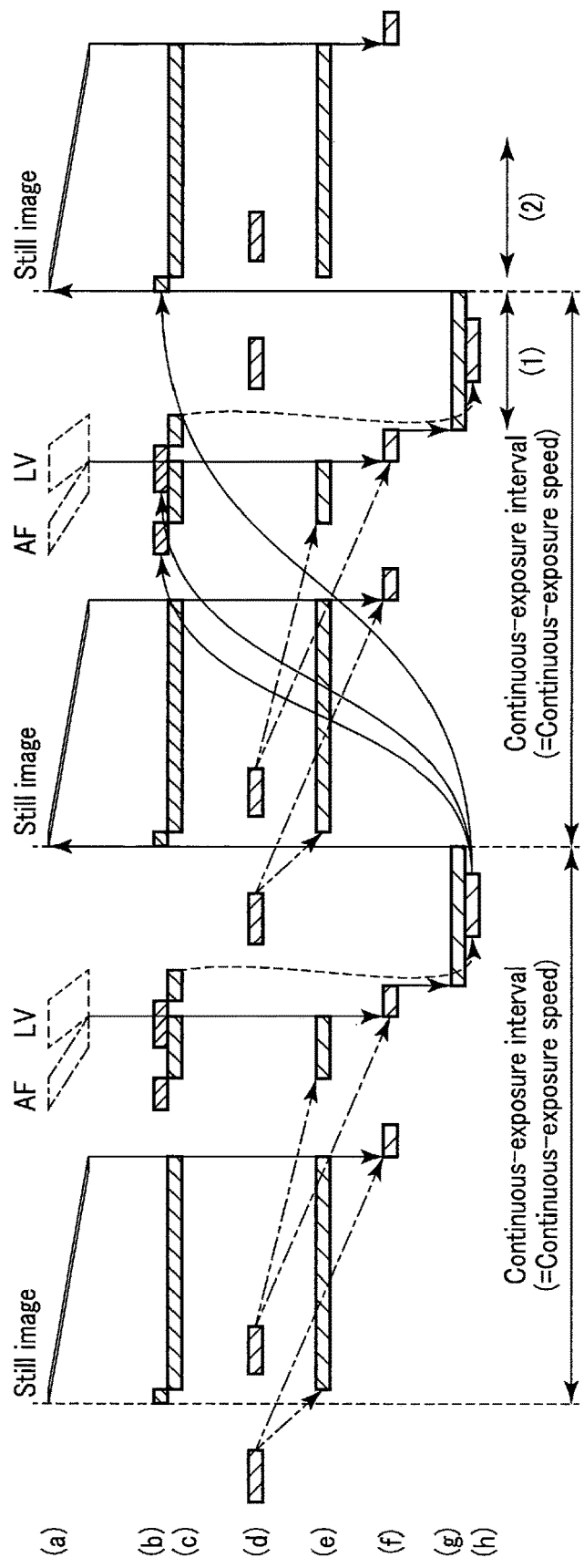
FIG. 11 is a timing chart according to a modification in which an AE computation is performed at the timing of driving the focus lens and the aperture.

Hereinafter, modifications of the present embodiment will be explained. The modifications shown in FIGS. 9, 10, and 11 are modifications of the AE computation.

In the example shown in FIG. 7, an AE computation is performed using image data acquired by the main exposure of the last frame. However, an AE computation may be performed using image data acquired by the latest imaging for live-view display, as shown in FIG. 9. By performing an AE computation using image data acquired by the latest imaging for live-view display, the AE computation can be performed using information on a subject at a timing closer to the main exposure. It is thereby possible to improve the capability of tracking the subject in the AE computation.

In the example shown in FIG. 7, an AE computation is performed at the timing of pixel signal reading subsequent to the main exposure. However, an AE computation may be performed at the timing of driving the focus lens 1021 and the aperture 1022, as shown in FIGS. 10 and 11. FIG. 10 shows an example in which an AE computation is performed using the results of the main exposure of the last frame, and FIG. 11 is an example in which an AE computation is performed using image data acquired by the latest imaging for live-view display. The timing of driving the focus lens 1021 and the aperture 1022 is also the timing when a distance measurement computation or the like is not performed. By performing an AE computation at this timing, it is possible to further improve the responsiveness in continuous exposure.

In the above-described embodiment, an imaging device designed to record images of, for example, a digital camera is taken as an example. However, the technique of the present embodiment is applicable to various imaging devices comprising a focus lens, and may be applicable to imaging devices that do not necessarily record images. In this respect, the technique of the present embodiment is applicable to imaging devices such as an endoscope device, a microscopic device, and a monitoring device.

The processing of the above-described embodiment may be stored as programs executable by the CPU 218, which is a computer. Alternatively, the processing may be stored in storage mediums of external storage devices, such as a magnetic disk, an optical disk, and a semiconductor memory, and may be distributed. The CPU 218 reads the programs stored in the storage medium of the external storage device, and executes the processing under the control of the read programs.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A focus detection apparatus comprising:
   an image sensor that includes a plurality of focus detection pixels and that images a subject via an imaging optical system;
   a correction value calculation circuit that calculates a correction value based on an optical state, the correction value being used to correct pixel signals output from the focus detection pixels, the optical state being associated with light fluxes from the subject incident on the focus detection pixels;
   a luminance correction circuit that corrects the pixel signals output from the focus detection pixels using the correction value; and
   a focus detection circuit that performs focus detection based on the corrected pixel signals,
   wherein the luminance correction circuit calculates, when imaging for still image capturing is performed in a continuous-exposure mode, the correction value based on the optical state during driving of a focus lens and an aperture immediately before the imaging for still image capturing by the image sensor, and calculates, when imaging for focus detection is performed in the continuous-exposure mode, the correction value based on the optical state during reading of the pixel signals acquired in a previous imaging for still image capturing, and the correction value calculation circuit performs the correction using the correction value simultaneously with the reading of the pixel signals from the focus detection pixels subsequent to the imaging for the still image capturing and the imaging for the focus detection.

2. The focus detection apparatus according to claim 1, wherein the optical state corresponds to a state of an aperture value in the imaging for the still image capturing, and the correction value calculation circuit calculates the correction value based on the aperture value.

3. The focus detection apparatus according to claim 2, further comprising an exposure control circuit that calculates an exposure setting value including the aperture value, the aperture value being used in the imaging for the still image capturing based on pixel signals acquired by imaging for still image capturing prior to current still image capturing, during reading of pixel signals acquired by imaging for the current still image capturing.

4. The focus detection apparatus according to claim 1, wherein the optical state corresponds to an amount of movement of the imaging optical system or the image sensor in camera shake correction, when the camera shake correction moves the imaging optical system or the image sensor, and the correction value calculation circuit calculates the correction value based on an amount of movement of the imaging optical system or the image sensor during initialization of the camera shake correction.

5. The focus detection apparatus according to claim 4, wherein the correction value calculation circuit calculates the correction value, the correction value is used in imaging for focus detection performed subsequently to imaging for current still image capturing, based on the amount of movement of the imaging optical system or the image sensor during the initialization.

6. The focus detection apparatus of claim 1 wherein the continuous-exposure mode includes repeatedly performing a sequence of still imaging, auto-focus imaging, live view display imaging.

7. The focus detection apparatus of claim 6 wherein the continuous-exposure mode further includes repeatedly performing focus lens and aperture driving after the auto-focus imaging.

8. A focus detection method comprising:

causing an image sensor that includes a plurality of focus detection pixels to image a subject via an imaging optical system;

calculating a correction value based on an optical state, the correction value being used to correct pixel signals output from the focus detection pixels, the optical state being associated with light fluxes from the subject incident on the focus detection pixels;

correcting the pixel signals output from the focus detection pixels using the correction value; and performing focus detection based on the corrected pixel signals, wherein the calculating of the correction value includes calculating, when imaging for still image capturing is performed in a continuous-exposure mode, the correction value based on the optical state during driving of a focus lens and an aperture immediately before imaging for still image capturing by the image sensor, and calculates, when imaging for focus detection is performed in the continuous-exposure mode, the correction value based on the optical state during reading of the pixel signals acquired in a previous imaging for still image capturing, and the correcting includes performing the correction using the correction value simultaneously with the reading of the pixel signals from the focus detection pixels subsequent to the imaging for the still image capturing and the imaging for the focus detection by the image sensor.

9. The focus detection method of claim 8 wherein the continuous-exposure mode includes repeatedly performing a sequence of still imaging, auto-focus imaging, live view display imaging.

10. The focus detection method of claim 9 wherein the continuous-exposure mode further includes repeatedly performing focus lens and aperture driving after the auto-focus imaging.

* * * * *